US009609165B2

(12) United States Patent
Suzuki et al.

(10) Patent No.: US 9,609,165 B2
(45) Date of Patent: Mar. 28, 2017

(54) PROCESSING IMAGE READ BY OVERLAPPING ADJACENT LINE SENSORS BY DETECTING FREQUENCY OF DENSITY VARIATIONS IN SEAM-READ IMAGE AND SYNTHESIZING SEAM-READ IMAGES BASED ON DETECTION RESULT TO FORM SEAM IMAGE

(71) Applicants: Rie Suzuki, Kanagawa (JP); Hideaki Suzuki, Kanagawa (JP)

(72) Inventors: Rie Suzuki, Kanagawa (JP); Hideaki Suzuki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/967,854

(22) Filed: Dec. 14, 2015

(65) Prior Publication Data

US 2016/0173715 A1   Jun. 16, 2016

(30) Foreign Application Priority Data

Dec. 15, 2014 (JP) .................................. 2014-253332
Nov. 10, 2015 (JP) .................................. 2015-220553

(51) Int. Cl.
*H04N 1/04* (2006.01)
*H04N 1/193* (2006.01)
(Continued)

(52) U.S. Cl.
CPC ......... *H04N 1/0458* (2013.01); *H04N 1/0032* (2013.01); *H04N 1/00411* (2013.01);
(Continued)

(58) Field of Classification Search
None
See application file for complete search history.

(56) References Cited

U.S. PATENT DOCUMENTS 5,481,375 A * 1/1996 Eto .................... H04N 1/00795
                                                          358/450
5,515,181 A * 5/1996 Iyoda ..................... G06T 3/403
                                                          358/296
(Continued)

FOREIGN PATENT DOCUMENTS

JP     2007-336440    12/2007
JP     2009-135919     6/2009

*Primary Examiner* — Scott A Rogers
(74) *Attorney, Agent, or Firm* — Harness, Dickey & Pierce, P.L.C.

(57) ABSTRACT

A read image processing apparatus is provided for processing a read image read by line image sensors arranged such that one end parts of which adjacent to each other are overlapped in a sub-scanning direction. The read image processing apparatus includes a density variation detector, a seam processor, and a line image generator. The density variation detector detects whether a density variation occurs for not less than a predetermined number of times or not in each of a plurality of regions in a seam-read image. The seam processor generates a seam image by synthesizing the seam-read images read by the line image sensors adjacent to each other in accordance with a detection result made by the density variation detector. The line image generator generates a read image corresponding to one line based on read images read by the line image sensors and the seam image generated by the seam processor.

10 Claims, 12 Drawing Sheets

(51) Int. Cl.
*H04N 1/387* (2006.01)
*H04N 1/00* (2006.01)
*H04N 1/19* (2006.01)

(52) U.S. Cl.
CPC ..... *H04N 1/00708* (2013.01); *H04N 1/00801* (2013.01); *H04N 1/0405* (2013.01); *H04N 1/0408* (2013.01); *H04N 1/0414* (2013.01); *H04N 1/0449* (2013.01); *H04N 1/1903* (2013.01); *H04N 1/1933* (2013.01); *H04N 1/3876* (2013.01); *H04N 2201/0094* (2013.01)

(56) References Cited

U.S. PATENT DOCUMENTS

| | | | | |
|---|---|---|---|---|
| 6,215,914 B1 * | 4/2001 | Nakamura | ............ | H04N 1/3876 348/584 |
| 6,233,066 B1 * | 5/2001 | Kojima | ................ | H04N 1/0402 358/404 |
| 7,130,077 B2 * | 10/2006 | Takahashi | ............ | H04N 1/0464 358/1.9 |
| 2009/0128854 A1 | 5/2009 | Takei | | |

\* cited by examiner

| ATTENTION PIXEL | EDGE | DETERMINATION RESULT | IDEAL |
|---|---|---|---|
| 1 | 4 | HALFTONE | HALFTONE |
| 2 | 4 | HALFTONE | HALFTONE |
| 3 | 4 | HALFTONE | HALFTONE |
| 4 | 4 | HALFTONE | HALFTONE |
| 5 | 4 | HALFTONE | HALFTONE |
| 6 | 2 | HALFTONE | HALFTONE |
| 7 | 1 | SOLID | HALFTONE |
| 8 | 1 | SOLID | HALFTONE |
| 9 | 1 | SOLID | SOLID |
| 10 | 1 | SOLID | SOLID |
| 11 | 0 | SOLID | SOLID |
| 12 | 0 | SOLID | SOLID |
| 13 | 0 | SOLID | SOLID |

FIG. 9A
RELATED ART
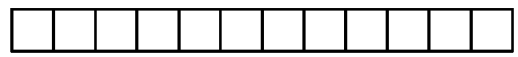
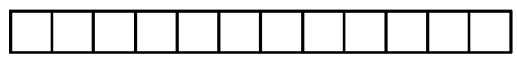
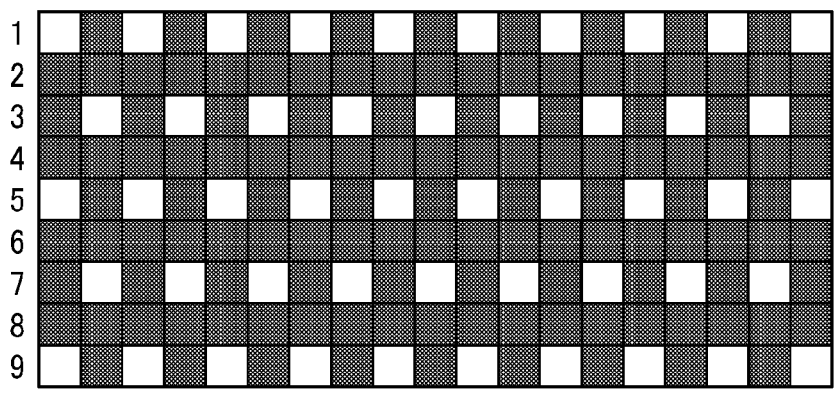
FIG. 9B
RELATED ART
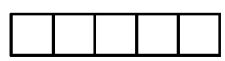
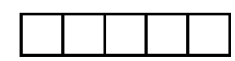
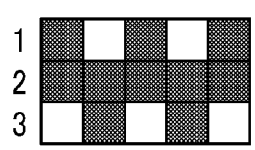
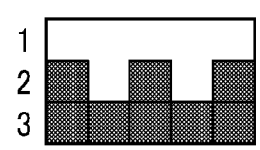
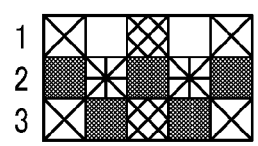

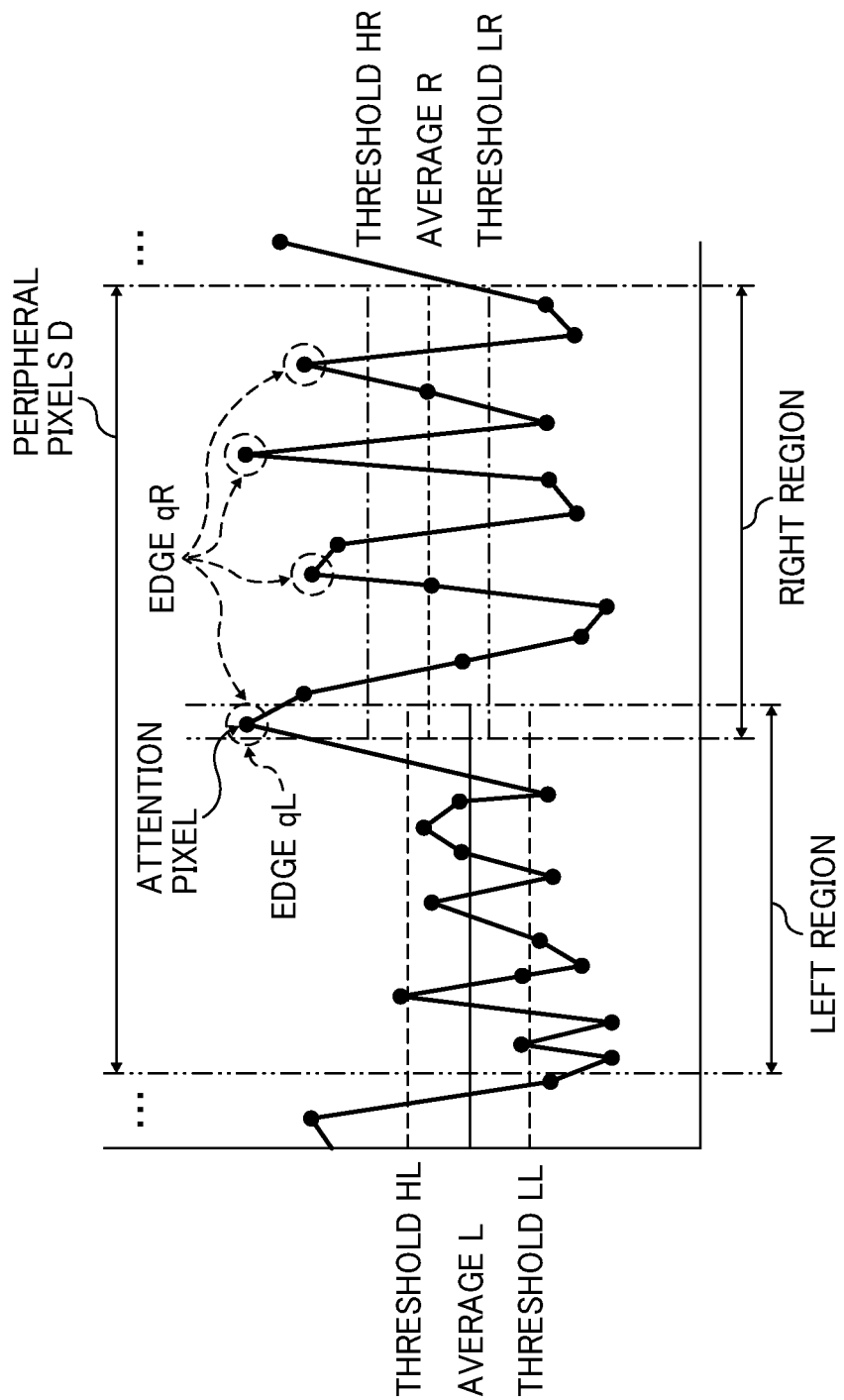

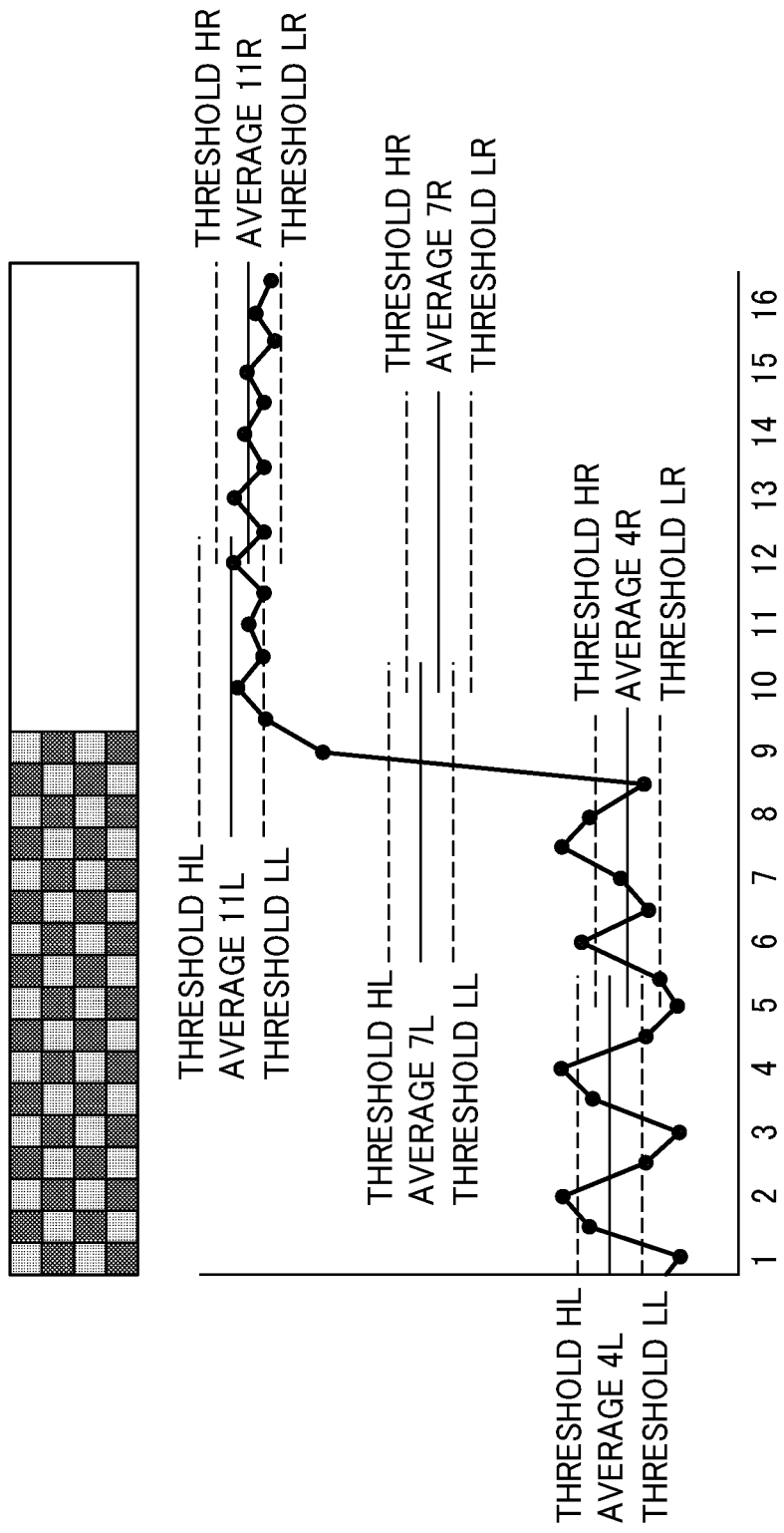

FIG. 11B

| ATTENTION PIXEL | EDGE | | DETERMINATION RESULT | | FINAL DETERMINATION | IDEAL |
|---|---|---|---|---|---|---|
| | LEFT SIDE | RIGHT SIDE | LEFT SIDE | RIGHT SIDE | | |
| 1 | 4 | 4 | HALFTONE | HALFTONE | HALFTONE | HALFTONE |
| 2 | 4 | 4 | HALFTONE | HALFTONE | HALFTONE | HALFTONE |
| 3 | 4 | 3 | HALFTONE | HALFTONE | HALFTONE | HALFTONE |
| 4 | 4 | 2 | HALFTONE | HALFTONE | HALFTONE | HALFTONE |
| 5 | 4 | 1 | HALFTONE | SOLID | HALFTONE | HALFTONE |
| 6 | 4 | 0 | HALFTONE | SOLID | HALFTONE | HALFTONE |
| 7 | 4 | 0 | HALFTONE | SOLID | HALFTONE | HALFTONE |
| 8 | 4 | 0 | HALFTONE | SOLID | HALFTONE | HALFTONE |
| 9 | 3 | 0 | HALFTONE | SOLID | HALFTONE | SOLID |
| 10 | 2 | 0 | HALFTONE | SOLID | HALFTONE | SOLID |
| 11 | 1 | 0 | SOLID | SOLID | SOLID | SOLID |
| 12 | 0 | 0 | SOLID | SOLID | SOLID | SOLID |
| 13 | 0 | 0 | SOLID | SOLID | SOLID | SOLID |

| ATTENTION PIXEL | EDGE | | | | FINAL DETERMINATION | IDEAL |
|---|---|---|---|---|---|---|
| | CIS201 | | CIS202 | | | |
| | LEFT SIDE | RIGHT SIDE | LEFT SIDE | RIGHT SIDE | | |
| 1 | 4 | 3 | 4 | 4 | HALFTONE | HALFTONE |
| 2 | 4 | 2 | 4 | 4 | HALFTONE | HALFTONE |
| 3 | 4 | 1 | 4 | 3 | HALFTONE | HALFTONE |
| 4 | 4 | 0 | 4 | 2 | HALFTONE | HALFTONE |
| 5 | 4 | 0 | 4 | 1 | HALFTONE | HALFTONE |
| 6 | 4 | 0 | 4 | 0 | HALFTONE | HALFTONE |
| 7 | 3 | 0 | 4 | 0 | HALFTONE | HALFTONE |
| 8 | 2 | 0 | 4 | 0 | HALFTONE | HALFTONE |
| 9 | 1 | 0 | 3 | 0 | HALFTONE | SOLID |
| 10 | 0 | 0 | 2 | 0 | HALFTONE | SOLID |
| 11 | 0 | 0 | 1 | 0 | SOLID | SOLID |
| 12 | 0 | 0 | 0 | 0 | SOLID | SOLID |
| 13 | 0 | 0 | 0 | 0 | SOLID | SOLID |
| 14 | 0 | 0 | 0 | 0 | SOLID | SOLID |
| 15 | 0 | 0 | 0 | 0 | SOLID | SOLID |

FIG. 13

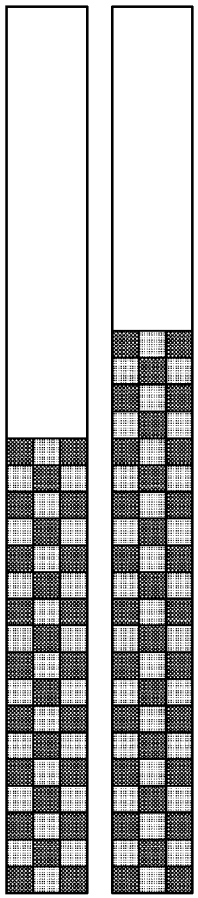

| ATTEN-TION PIXEL | EDGE | | | | DETERMINATION RESULT | | FINAL DETERMINATION | IDEAL |
|---|---|---|---|---|---|---|---|---|
| | CIS201 | | CIS202 | | CIS201 | CIS202 | | |
| | LEFT SIDE | RIGHT SIDE | LEFT SIDE | RIGHT SIDE | | | | |
| 1 | 4 | 3 | 4 | 4 | HALFTONE | HALFTONE | HALFTONE | HALFTONE |
| 2 | 4 | 2 | 4 | 4 | HALFTONE | HALFTONE | HALFTONE | HALFTONE |
| 3 | 4 | 1 | 4 | 3 | HALFTONE | HALFTONE | HALFTONE | HALFTONE |
| 4 | 4 | 0 | 4 | 2 | HALFTONE | HALFTONE | HALFTONE | HALFTONE |
| 5 | 4 | 0 | 4 | 1 | HALFTONE | HALFTONE | HALFTONE | HALFTONE |
| 6 | 4 | 0 | 4 | 0 | HALFTONE | HALFTONE | HALFTONE | HALFTONE |
| 7 | 3 | 0 | 4 | 0 | HALFTONE | HALFTONE | HALFTONE | HALFTONE |
| 8 | 2 | 0 | 4 | 0 | HALFTONE | HALFTONE | HALFTONE | HALFTONE |
| 9 | 1 | 0 | 3 | 0 | SOLID | HALFTONE | HALFTONE | SOLID |
| 10 | 0 | 0 | 2 | 0 | SOLID | HALFTONE | HALFTONE | SOLID |
| 11 | 0 | 0 | 1 | 0 | SOLID | SOLID | SOLID | SOLID |
| 12 | 0 | 0 | 0 | 0 | SOLID | SOLID | SOLID | SOLID |
| 13 | 0 | 0 | 0 | 0 | SOLID | SOLID | SOLID | SOLID |
| 14 | 0 | 0 | 0 | 0 | SOLID | SOLID | SOLID | SOLID |
| 15 | 0 | 0 | 0 | 0 | SOLID | SOLID | SOLID | SOLID |

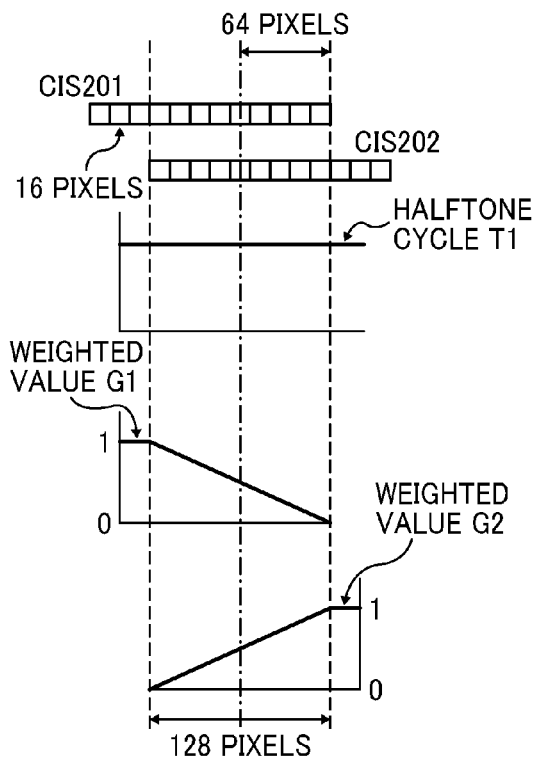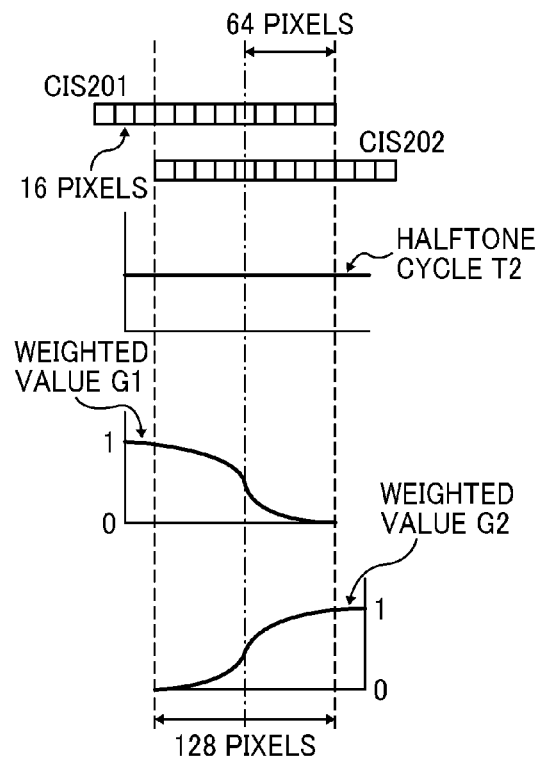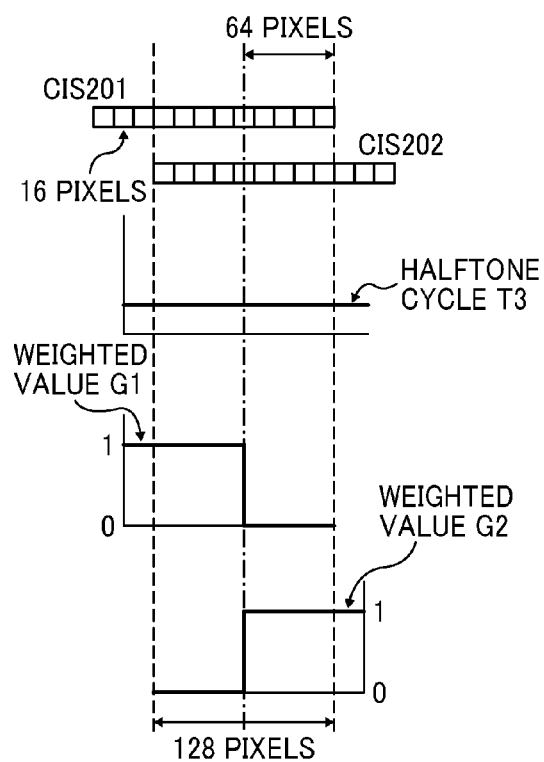

PROCESSING IMAGE READ BY OVERLAPPING ADJACENT LINE SENSORS BY DETECTING FREQUENCY OF DENSITY VARIATIONS IN SEAM-READ IMAGE AND SYNTHESIZING SEAM-READ IMAGES BASED ON DETECTION RESULT TO FORM SEAM IMAGE

CROSS-REFERENCE TO RELATED APPLICATIONS

This patent application is based on and claims priority pursuant to 35 U.S.C. §119(a) to Japanese Patent Application Nos. 2014-253332 and 2015-220553, filed on Dec. 15, 2014 and Nov. 10, 2015, respectively, in the Japan Patent Office, the entire disclosure of each of which is hereby incorporated by reference herein.

BACKGROUND

Technical Field

The present disclosure relates to a read image processing apparatus, an image reading apparatus, an image forming apparatus, a method of processing a read image, and a non-transitory recording medium.

Description of the Related Art

In accordance with a recent trend of propelling electronization of information, image processing apparatuses are being demanded. Such image processing apparatuses include printer and facsimile machine for outputting electronized information and scanner for electronizing documents. Having functions of imaging, image formation, communication, and the like, most image forming apparatuses configure a multifunction peripheral that can be used as printer, facsimile machine, scanner, and copier.

As the scanner for electronizing documents, a wide-format image reading device corresponding to A0-size is known. In such a wide-format image reading device, multiple line image sensors each relatively short in length, which may be corresponding to A4-size, are arranged in a zigzag manner in the main scanning direction. The wide-format image reading device is capable of reading a wide document by synthesizing image data read by the multiple line image sensors.

Being arranged in a zigzag manner in the main scanning direction, the multiple short line image sensors are out of alignment in the sub-scanning direction. Therefore, when outputting an image on a wide sheet, which may be corresponding to A0-size, a misalignment may be generated in the image data corresponding to the seam portion of the multiple line image sensors depending on the sheet feeding speed, or the like condition.

SUMMARY

In accordance with some embodiments of the present invention, a read image processing apparatus is provided for processing a read image read by a reading part including a plurality of line image sensors, each of which including reading elements arranged in line corresponding to pixels, arranged in such a manner that one end parts of the line image sensors adjacent to each other are overlapped with each other in a direction perpendicular to a direction of alignment of the reading elements. The read image processing apparatus includes a density variation detector, a seam processor, and a line image generator. The density variation detector detects whether a density variation occurs for not less than a predetermined number of times or not in each of a plurality of regions in a seam-read image. Here, the seam-read image is an image read by the reading elements present within a seam portion in which the line image sensors adjacent to each other are overlapped with each other. The seam processor generates a seam image by synthesizing the seam-read images read by the line image sensors adjacent to each other in accordance with a detection result made by the density variation detector. Here, the seam image is an image of the seam portion. The line image generator generates a read image corresponding to one line based on read images read by the line image sensors and the seam image generated by the seam processor.

In accordance with some embodiments of the present invention, a method of processing a read image is provided. In particular, the read image is read by a reading part including a plurality of line image sensors, each of which including reading elements arranged in line corresponding to pixels, arranged in such a manner that one end parts of the line image sensors adjacent to each other are overlapped with each other in a direction perpendicular to a direction of alignment of the reading elements. The method includes the step of detecting whether a density variation occurs for not less than a predetermined number of times or not in each of a plurality of regions in a seam-read image. Here, the seam-read image is an image read by the reading elements present within a seam portion in which the line image sensors adjacent to each other are overlapped with each other. The method further includes the step of generating a seam image by synthesizing the seam-read images read by the line image sensors adjacent to each other in accordance with a detection result made in the detecting. Here, the seam image is an image of the seam portion. The method further includes the step of generating a read image corresponding to one line based on read images read by the line image sensors and the seam image.

In accordance with some embodiments of the present invention, a non-transitory recording medium storing a plurality of instructions which, when executed by one or more processors, cause the processors to perform the above method of processing a read image is provided.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 9A and 9B are illustrations showing a seam correction processing according to a related art;

FIG. 10 is an illustration showing a halftone/solid determination processing in accordance with an embodiment of the present invention;

FIGS. 11A and 11B are illustrations showing a halftone/solid determination processing in accordance with an embodiment of the present invention;

FIG. 13 is an illustration showing a halftone/solid determination processing in accordance with an embodiment of the present invention; and FIGS. 14A to 14C are illustrations each showing a weighing processing in accordance with an embodiment of the present invention.

Figure 1:
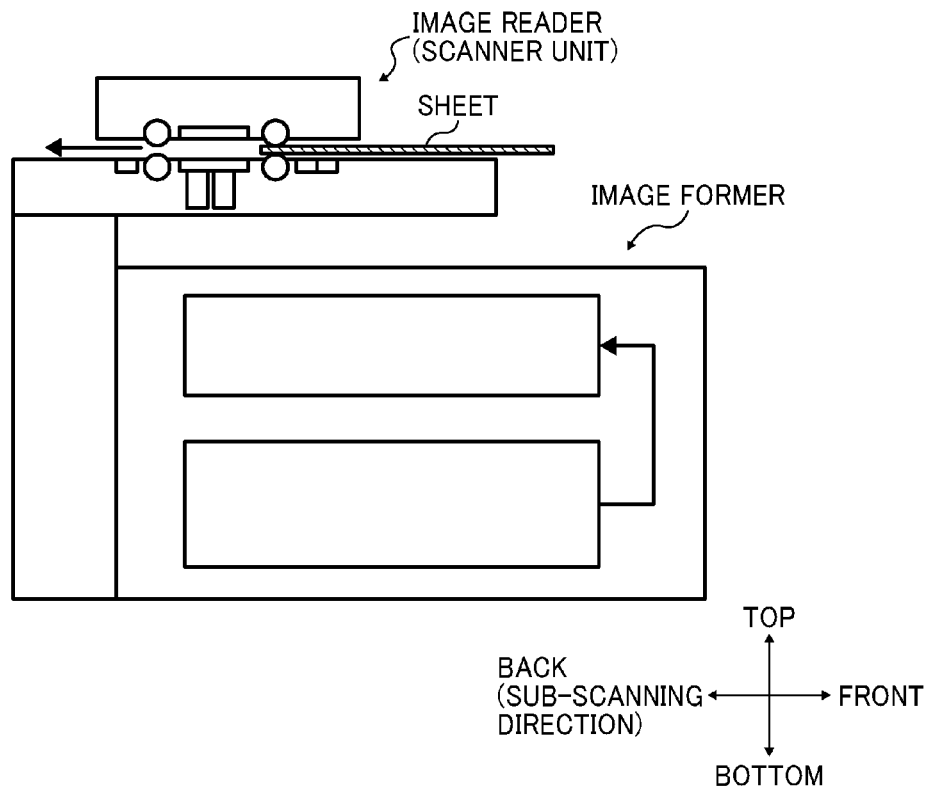
FIG. 1 is a schematic view of an image processing apparatus in accordance with an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

One object of the present invention is to provide a read image processing apparatus capable of reading a wide-format image by connecting images read by multiple line sensors which can perform a proper correction processing when connecting images read by the line image sensors adjacent to each other.

FIG. 1 is a schematic view of an image processing apparatus 1 in accordance with an embodiment of the present invention, which is a multifunction peripheral including a wide-format image reader corresponding to A0 size.

Figure 2:
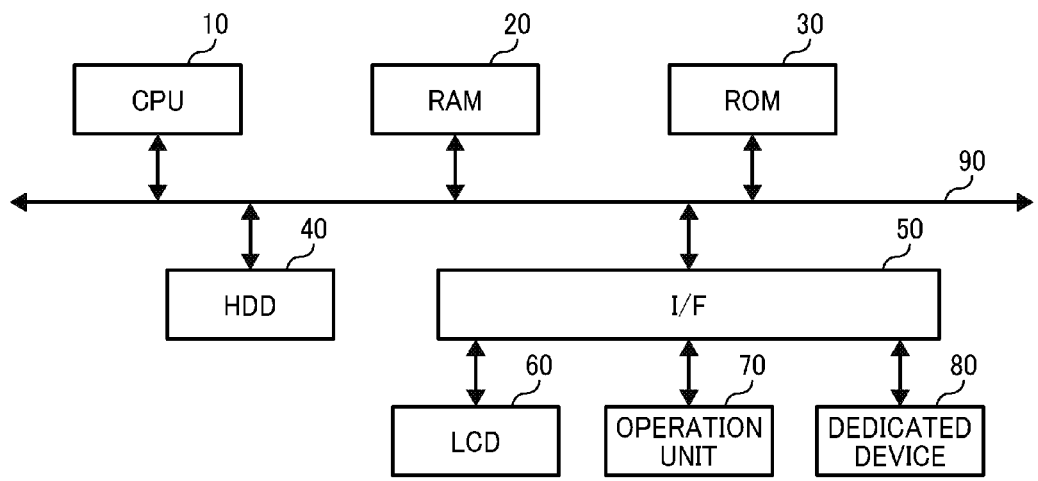
FIG. 2 is a block diagram of a hardware configuration of the image processing apparatus.

A hardware configuration of the image processing apparatus 1 is described below with reference to FIG. 2. FIG. 2 is a block diagram of a hardware configuration of the image processing apparatus 1. As illustrated in FIG. 2, the image processing apparatus 1 has a configuration similar to that of a typical information processing apparatus such as personal computer (PC) or sever. In the image processing apparatus 1, a central processing unit (CPU) 10, a random access memory (RAM) 20, a read only memory (ROM) 30, a hard disk drive (HDD) 40, and an interface (I/F) 50 are connected through a bus 90. A liquid crystal display (LCD) 60, an operation unit 70, and a dedicated device 80 are connected to the I/F 50.

The CPU 10 is a calculator that controls the entire operation of the image processing apparatus 1. The RAM 20 is a high-speed read-write volatile storage medium serving as a working area in which the CPU 10 processes information. The ROM 30 is a read-only non-volatile storage medium in which programs, such as firmware, are stored. The HDD 40 is a read-write non-volatile storage medium in which operating system (OS) and various control programs application programs are stored.

The I/F 50 connects the bus 90 to the various hardware and networks, and controls them. The LCD 60 is a visual user interface that allows user to check the status of the image processing apparatus 1. The operation unit 70 is a user interface that allows user to input information to the image processing apparatus 1. In the present embodiment, the operation unit 70 includes a touch panel and a hardware key.

The dedicated device 80 is hardware that gives a special function to the image processing apparatus 1. The dedicated device 80 may be, for example, a print engine for executing image forming output on a paper sheet or a scanner unit for reading image on a paper sheet. In the present embodiment, the image processing apparatus 1 includes a scanner unit as the dedicated device 80.

In the above-described hardware configuration, a program stored in the ROM 30, the HDD 40, or another recording medium such as an optical disc is read out to the RAM 20. As the CPU 10 performs a calculation according to the program, a software controller is configured. The combination of the software controller thus configured with the above-described hardware configuration forms a functional block which implements the function of the image processing apparatus 1.

Figure 3:
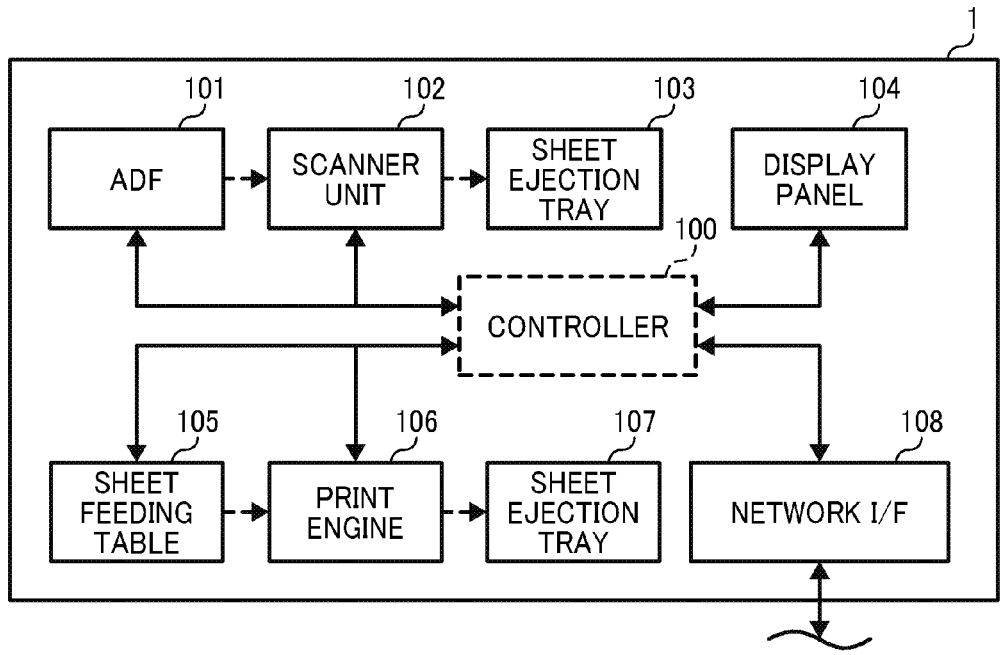
FIG. 3 is a block diagram of a functional configuration of the image processing apparatus.

A functional configuration of the image processing apparatus 1 is described below with reference to FIG. 3. FIG. 3 is a block diagram of a functional configuration of the image processing apparatus 1. As illustrated in FIG. 3, the image processing apparatus 1 includes a controller 100, an automatic document feeder (ADF) 101, a scanner unit 102, a sheet ejection tray 103, a display panel 104, a sheet feeding table 105, a print engine 106, a sheet ejection tray 107, and a network I/F 108.

Figure 4:
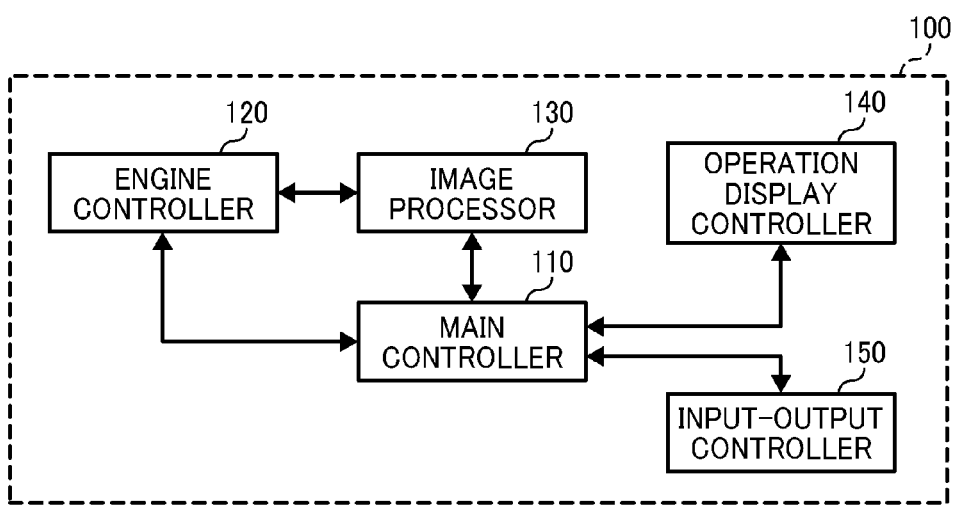
FIG. 4 is a block diagram of a functional configuration of a controller in the image processing apparatus.

A functional configuration of the controller 100 is described below with reference to FIG. 4. FIG. 4 is a block diagram of a functional configuration of the controller 100. As illustrated in FIG. 4, the controller 100 includes a main controller 110, an engine controller 120, an image processor 130, an operation display controller 140, and an input-output controller 150. As illustrated in FIG. 3, the image processing apparatus 1 is configured as a multifunction peripheral including the scanner unit 102 and the print engine 106. The operations of the scanner unit 102 and the print engine 106 are controlled by command signals output from the controller 100. In FIG. 3, solid-line arrows represent electric connections and dotted-line arrows represent the flows of sheets.

The display panel 104 serves as both an output interface for visually displaying the status of the image processing apparatus 1 and an input interface, such as a touch panel, for allowing user to directly operate the image processing apparatus 1 or input information to the image processing apparatus 1. Thus, the display panel 104 has a function of displaying an image for accepting operations by user. The function of the display panel 104 is implemented by the LCD 60 and the operation unit 70 both illustrated in FIG. 2.

The network I/F 108 is an interface, such as Ethernet (registered trademark) and universal serial bus (USB), for allowing the image processing apparatus 1 to communicate with other devices therethrough. The network I/F 108 is capable of communicating based on TCP/IP protocol. When the image processing apparatus 1 functions as a facsimile machine, the network I/F 108 also functions as an interface for performing facsimile transmission. Accordingly, the network I/F 108 is also connected to a telephone circuit. The function of the network I/F 108 is implemented by the I/F 50 illustrated in FIG. 2.

The controller 100 is composed of a combination of software and hardware. More specifically, the controller 100 is composed of hardware (e.g., an integrated circuit) and a software controller implemented as the CPU 10 performs a calculation according to a program which has been stored in a non-volatile storage medium (e.g., the ROM 30, a non-volatile memory, the HDD 40, or an optical disc) and loaded to a volatile memory (e.g., the RAM 20). The controller 100 functions as a controller that controls the entire image processing apparatus 1.

The main controller 110 controls each part of the controller 100 by giving commands thereto. The engine controller 120 serves as a driver for controlling or driving the print engine 106, the scanner unit 102, or the like. The image processor 130 generates drawing information based on image information to be output, according to the control by the main controller 110. The drawing information is used by the print engine 106, serving as an image forming unit, for drawing an image to be formed during an image forming operation.

The image processor 130 processes imaging data input from the scanner unit 102 to generate image data. The image data, which results from the scanning operation, is stored in the storage area of the image processing apparatus 1 or transmitted to other information processing terminals and/or storage devices through the network I/F 108.

The operation display controller 140 displays information on the display panel 104, or notifies the main controller 110 of information input through the display panel 104. The input-output controller 150 inputs information which is input through the network I/F 108 to the main controller 110. The main controller 110 controls the input-output controller 150 and accesses the network I/F 108 and other devices connected through the network.

When the image processing apparatus 1 operates as a printer, first, the input-output controller 150 receives a print job through the network I/F 108. The input-output controller 150 transfers the received print job to the main controller 110. Upon receipt of the print job, the main controller 110 controls the image processor 130 to generate drawing information based on document information or image information included in the print job.

According to the present embodiment, the print job contains information on a to-be-output image written in an information format analyzable by the image processor 130 of the image processing apparatus 1 and information on parameters set upon image forming output. The information on parameter includes, for example, duplex printing settings, collective printing settings, and multicolor/monochrome printing settings.

Upon generation of the drawing information by the image processor 130, the engine controller 120 controls the print engine 106 to execute an image formation on a sheet of paper fed from the sheet feeding table 105 based on the generated drawing information. Thus, the image processor 130, the engine controller 120, and the print engine 106 function as an image formation output unit. Specific examples of the print engine 106 include, but are not limited to, an inkjet image forming mechanism and an electrophotographic image forming mechanism. The sheet on which an image has been formed by the print engine 106 is ejected on the sheet ejection tray 107.

When the image processing apparatus 1 operates as a scanner, according to an operation made on the display panel 104 by user or a scan execution instruction input from other device through the network I/F 108, the operation display controller 140 or the input-output controller 150 transfers a scan execution signal to the main controller 110. The main controller 110 controls the engine controller 120 based on the received scan execution signal.

The engine controller 120 drives the ADF 101 to feed a to-be-imaged document set in the ADF 101 to the scanner unit 102. The engine controller 120 also drives the scanner unit 102 to image the document fed from the ADF 101. In the case where the document is directly set in the scanner unit 102 without being set in the ADF 101, the scanner unit 102 images the set document according to the control by the engine controller 120. Thus, the scanner unit 102 operates as an imaging unit, and the engine controller 120 functions as a reading controller.

During the imaging operation, an imaging element (e.g., contact image sensor (CIS), charge-coupled device (CCD)) included in the scanner unit 102 optically scans the document to generate imaging information based on optical information. The engine controller 120 transfers the imaging information generated by the scanner unit 102 to the image processor 130. The image processor 130 generates image information based on the imaging information received from the engine controller 120, according to the control by the main controller 110.

The image information generated by the image processor 130 is acquired by the main controller 110, and the main controller 110 stores the image information in a storage medium mounted on the image processing apparatus 1, such as the HDD 40. Thus, the scanner unit 102, the engine controller 120, and the image processor 130 cooperatively function as an image inputting part. The image information generated by the image processor 130 is stored in the storage medium (e.g., HDD 40) in accordance with an instruction by user, or transmitted to an external device through the input-output controller 150 and the network I/F 108.

When the image processing apparatus 1 operates as a copier, the image processor 130 generates drawing information based on the imaging information received by the engine controller 120 from the scanner unit 102 or the image information generated by the image processor 130. Similar to the case of printer operation, the engine controller 120 drives the print engine 106 based on the drawing information. When the drawing information and the imaging information are in the same information format, the imaging information as it is can be used as the drawing information.

Figure 5:
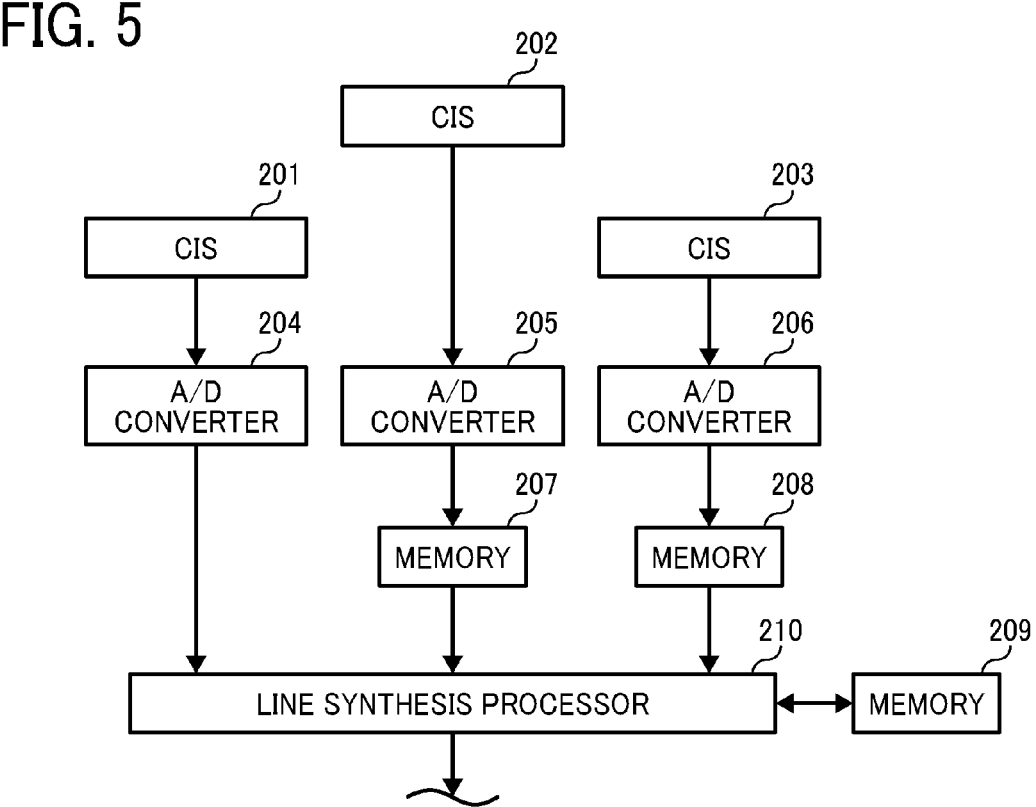
FIG. 5 is a block diagram of a functional configuration of a scanner unit in accordance with an embodiment of the present invention.

In the present embodiment, the scanner unit 102 has a characteristic configuration. A configuration of the scanner unit 102 is described below with reference to FIG. 5. As illustrated in FIG. 5, the scanner unit 102 includes a CIS 201, a CIS 202, a CIS 203, an A/D converter 204, an A/D converter 205, an A/D converter 206, a memory 207, a memory 208, a memory 209, and a line synthesis processor 210.

Each of the CIS 201, CIS202, and CIS 203 is a line image sensor in which multiple elements are arranged in line in the main scanning direction. The three line image sensors are so arranged that the total line width thereof covers the entire width of the A0-size sheets in the main scanning direction. The three line image sensors are arranged in a zigzag manner so that several pixels on one end part of each of the line image sensors are overlapped with those of an adjacent line image sensor. In other words, one end parts of the adjacent line image sensors are facing with each other in a direction perpendicular to the direction of arrangement of the pixels, thus providing a reading part that covers the entire reading range in the main scanning direction. According to the present embodiment, just for illustrative purposes, the target range is covered by three line image sensors, as described above. However, the number of the line image sensors is not limited to three, and may be two, four, or more.

The three line image sensors are out of alignment in the sub-scanning direction. The CIS 202 is arranged at the center relative to the main scanning direction and the most upstream side relative to the sub-scanning direction among the three line image sensors. The CIS 202 and CIS 203 are arranged on the respective ends relative to the main scanning direction and the downstream side relative to the sub-scanning direction among the three line image sensors. In particular, the CIS 201, CIS 202, and CIS 203 are arranged in a zigzag manner, just as illustrated in the functional block diagram of FIG. 5.

Image data output from the CIS 201 is converted into a digital signal by the A/D converter 204 and input to the line synthesis processor 210. Image data output from the CIS 202 and CIS 203 are converted into respective digital signals by the A/D converter 205 and A/D converter 206, respectively, and input to the line synthesis processor 210 after being delayed for a certain period by the memory 207 and memory 208, respectively.

The purpose of causing such delays by the memory 207 and memory 208 is to absorb the arrangement relational differences among the CIS 201, CIS 202, and CIS 203. The CIS 201 is arranged at the most downstream side relative to the sub-scanning direction. Therefore, the image data output from the CIS 201 is not required to be delayed by a memory, and directly input to the line synthesis processor 210. By contrast, the CIS 203 is arranged on a several-line-upstream side from the CIS 201 relative to the sub-scanning direction, for facilitating adjustment. Therefore, the image data output from the CIS 203 is required to be delayed by the memory 208.

The line synthesis processor 210 detects halftone dots at the seam portions where the CIS 201 and CIS 202 are overlapped and where the CIS 202 and CIS 203 are overlapped. The line synthesis processor 210 then performs a seam correction processing based on the detection result of halftone dots. The line synthesis processor 210 further performs a form-into-one-line processing for the results detected by the CIS 201, CIS 202, and CIS 203 after being subjected to the seam correction processing. Thus, the line synthesis processor 210 generates an imaging data corresponding to one line. The line synthesis processor 210 transfers the generated imaging data corresponding to one line to the engine controller 120 illustrated in FIG. 4. The memory 209 is used as a storage region during the line synthesis processing performed by the line synthesis processor 210.

Figure 6:
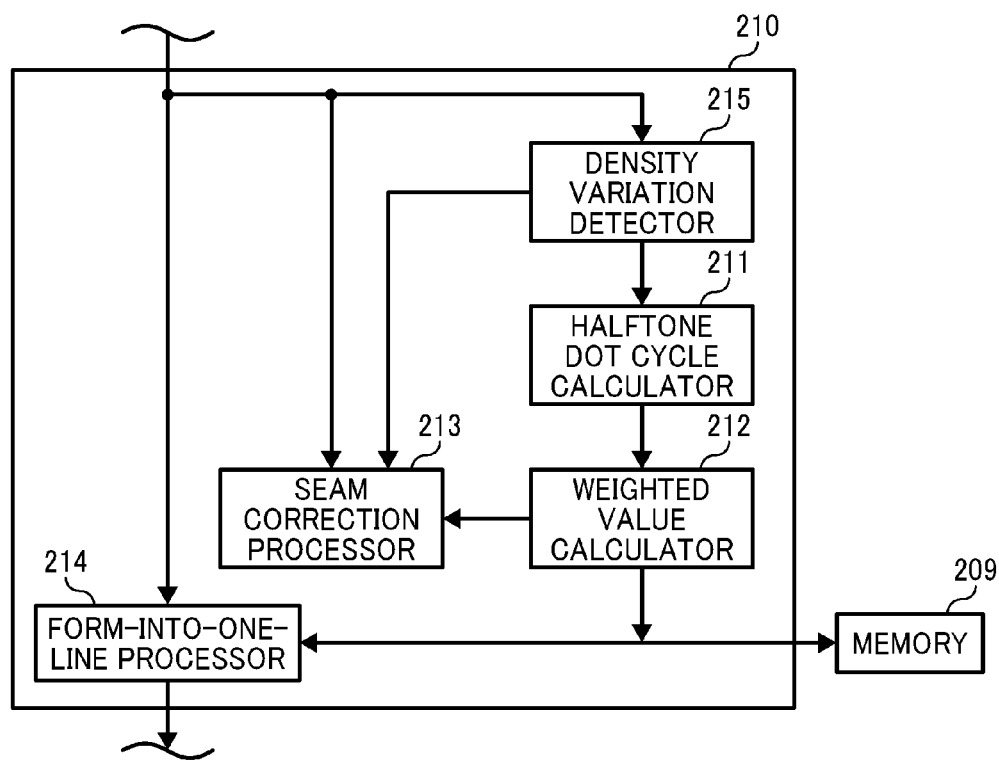
FIG. 6 is a block diagram of a functional configuration of a line synthesis processing part in accordance with an embodiment of the present invention.

A functional configuration of the line synthesis processor 210 is described below with reference to FIG. 6. As illustrated in FIG. 6, the line synthesis processor 210 includes a halftone dot cycle calculator 211, a weighted value calculator 212, a seam correction processor 213, a form-into-one-line processor 214, and a density variation detector 215. For illustrative purposes, only one input line to the line synthesis processor 210 is shown in FIG. 6. Actually, the number of input lines to the line synthesis processor 210 is three, each corresponding to the CIS 201, CIS 202, or CIS 203, as illustrated in FIG. 5.

The density variation detector 215 refers to pixels on the seam portions of the CIS 201, CIS 202, and CIS 203 to obtain a seam-read image, and determines whether the seam-read image is a halftone image in which the image density varies in a cyclic manner. More specifically, the density variation detector 215 detects the number of edges in the seam-read image at which a predetermined amount of difference is generated in the image density.

The halftone cycle calculator 211 calculates the cycle of image density variation (hereinafter "halftone cycle") in the above-determined halftone image. How the halftone cycle calculator 211 calculates the halftone cycle is described in detail later.

Figure 7A:
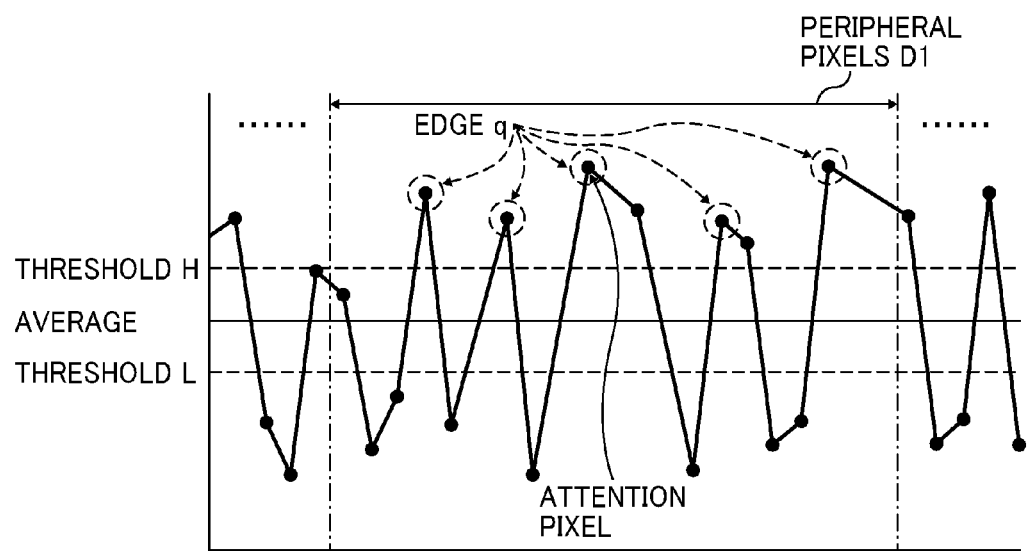
FIGS. 7A and 7B are illustrations showing a halftone/solid determination processing in accordance with an embodiment of the present invention.
Figure 7B:
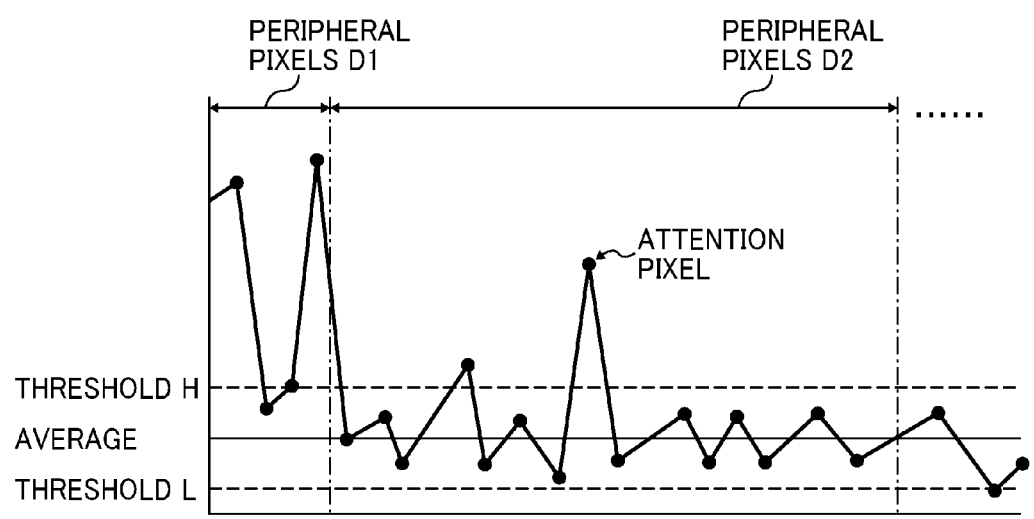

FIG. 7A is a graph showing the relation between the density and the position of each pixel in the main scanning direction when the seam-read image is detected as a halftone image. FIG. 7B is a graph showing the relation between the density and the position of each pixel in the main scanning direction when the seam-read image is detected as a solid image.

In FIGS. 7A and 7B, the vertical and horizontal axes respectively denote the density and the position of each pixel in the seam-read image. In FIGS. 7A and 7B, "average" refers to the average density among an attention pixel and peripheral pixels, to be described in detail later. The average density is required for calculating thresholds H and L.

The density variation detector 215 determines one pixel to pay attention (hereinafter "attention pixel") for detecting edges in the seam-read image. The edge is defined as a portion where a predetermined amount of difference is generated in the image density, as described above. The density variation detector 215 determines edges based on the thresholds H and L shown in FIGS. 7A and 7B. More specifically, the density variation detector 215 refers to the density of pixels arranged in the main scanning direction in turn, and detects an edge when the density transits from a value not greater than the threshold L to another value greater than the threshold H. The density variation detector 215 detects edges by paying attention to each one of the pixels from one end to another in the seam-read image.

After determining the attention pixel, the density variation detector 215 determines a group of several pixels (hereinafter "peripheral pixels") arranged in a bilaterally symmetrical order relative to the attention pixel, for calculating the average density. In the cases illustrated in FIGS. 7A and 7B, the number of peripheral pixels is 15, and the 8th pixel at the middle thereamong is the attention pixel. In this case, 15 pixels in total, including the attention pixel, 7 pixels on the left thereof, and 7 pixels on the right thereof, are the peripheral pixels. After determining the peripheral pixels, the density variation detector 215 calculates the average density among the peripheral pixels. Thereafter, the density variation detector 215 determines the thresholds H and L based on the average density. The density variation detector 215 counts the number of edges detected within the region where the peripheral pixels present to determine whether the seam-read image is halftone or solid.

The density variation detector 215 determines that the seam-read image is halftone when the number of edges is in excess of a predetermined value, or solid when the number of edges is not in excess of the predetermined value. In the present embodiment, the seam-read image is determined to be halftone when the number of edges is 2 or more, or to be solid when the number of edges is 1 or less. Such a determination is made for each attention pixel. In the case illustrated in FIG. 7A, the seam-read image is determined to be halftone because the number of edges is not less than 2. In the case illustrated in FIG. 7B, the seam-read image is determined to be solid because no edge is detected. The detection of edges is necessary not only for determining whether the seam-read image is halftone or solid by the density variation detector 215, but also for calculating the halftone dot cycle by the halftone dot cycle calculator 211, to be described in detail later.

In case the seam portion is actually a halftone image but has a fouling in part, or a halftone image part and a solid image part are coexisting in the seam-read image, the determination of whether the seam portion is halftone or not cannot be properly conducted. If a fouling is attached to a part of a halftone image, the fouling is detected in that part instead of halftone dots. As a result, the detected density variation will be not in accordance with the actual density variation of the halftone image, as illustrated in FIG. 7A, but will be similar to that of a solid image, as illustrated in FIG. 7B. Thus, the halftone image cannot be properly determined to be halftone since no edge is detected.

If a halftone image part and a solid image part are coexisting in the seam-read image, the determination of whether the seam portion is halftone or not may not be properly conducted even based on the calculated average value or the number of detected edges. Such a case is described below with reference to FIGS. 8A and 8B.

Figures 8A, 8B:
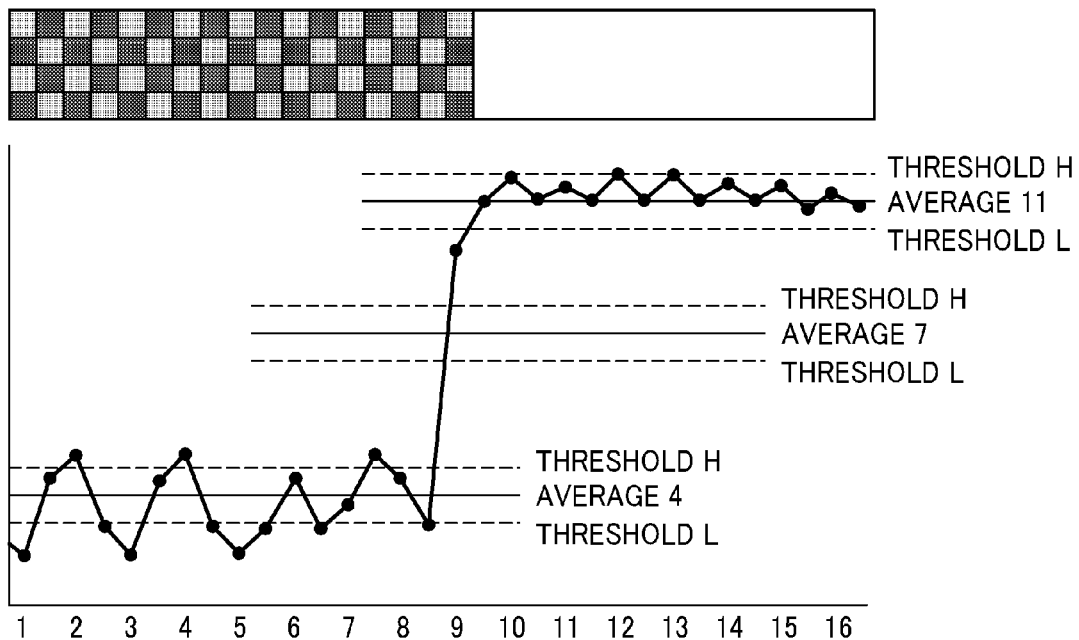
FIGS. 8A and 8B are illustrations showing a halftone/solid determination processing according to a related art.

FIG. 8A is a graph showing the relation between the density and the position of each pixel in the main scanning direction in the seam-read image which includes a halftone image part relatively low in lightness and a solid image part relatively high in lightness. In FIG. 8A, the vertical and horizontal axes respectively denote the density and the position of each pixel. In the case illustrated in FIG. 8A, the number of the peripheral pixels is 15, similar to the above-described case. The average 4 is the average density when the attention pixel is the 4th pixel. The average 7 and average 11 are the average densities when the attention pixel is the 7th and 11th pixels, respectively.

FIG. 8B is a table showing the determination results whether the seam-read image is halftone or solid for each attention pixel. When the attention pixel is the 7th or 8th pixel, the image should be determined to be halftone ideally. However, in each case, the determination result indicates that the image is erroneously determined to be solid since the number of detected edges is less than the predetermined value.

When the attention pixel is the 7th pixel, the peripheral pixels include both a high-lightness portion and a low-lightness portion. Thus, the average density (average 7) is positioned between the density of the light-lightness portion and that of the low-lightness portion, as illustrated in FIG. 8A. Accordingly, a density transition from a value not greater than the threshold L to another value greater than the threshold H occurs only once, with respect to the average 7, as illustrated in FIG. 8A. As a result, the image is determined not to be halftone because the number of detected edges is too small. The same applies to the case where the attention pixel is the 8th pixel. Such a problem is likely to occur when the attention pixel is selected from pixels positioned at the boundary of two regions each having different densities. Such an improper determination result further causes a problem described below.

FIG. 9A is an illustration of an image including both a halftone part and a solid part, to be read by the CIS 201 and CIS 202. FIG. 9B is an illustration of an image generated by seam-correction-processing the seam-read images read by the CIS 201 and CIS 202. In FIG. 9B, the amount of hatching corresponds to the density level.

When the CIS 201 and CIS 202 are out of alignment in the sub-scanning direction, the determination results made by the CIS 201 and CIS 202 will be different from each other in the case of reading the image illustrated in FIG. 9A. On the other hand, in the seam correction processing, the seam-read images read by the CIS 201 and CIS 202 are processed in such a manner that they are added together at a predetermined ratio. Therefore, when the image illustrated in FIG. 9A is read by the CIS 201 and CIS 202 that are out of alignment in the sub-scanning direction and subjected to the seam correction processing, the density difference in the halftone part is eliminated as illustrated in FIG. 9B.

To avoid such an elimination of the density difference in the halftone part, in the case where the read image is determined to be halftone, the seam correction processor 213 properly switches the mode of the seam correction processing so as not to eliminate the density difference. However, if the determination result is improper, the read image will be improperly processed even when the image is actually halftone.

In determining whether the seam-read image is halftone or solid in a conventional manner, first, the attention pixel and peripheral pixels are set and the average density thereamong is calculated. Next, the thresholds H and L are set based on the average density. The density variation detector 215 then determines whether the seam-read image is halftone or solid based on the number of detected edges. However, this procedure causes the problem described above with reference to FIGS. 8A and 8B. According to some embodiments of the present invention, the detection range is divided into two regions, and a different detection procedure is performed in each of the two regions. The above problem is solved by employing one of the two detection results which is greater in the number of detected edges. Namely, the problem is solved by employing one of the two the detection result which indicates that the region is detected to be halftone. Such a detection procedure in accordance with some embodiments of the present invention is described in detail below.

FIG. 10 is an illustration showing a method of determining whether the seam-read image is halftone or solid. In this method, a detection region is divided into left and right regions respectively ranging on the left and light sides relative to the attention pixel. In the left region, an average L, a threshold HL, a threshold LL, and an edge qL are determined. In the right region, an average R, a threshold HR, a threshold LR, and an edge qR are determined. In the case illustrated in FIG. 10, the left region is determined to be solid because only one edge is detected. On the other hand, the right region is determined to be halftone because four edges are detected. In the case where both halftone and solid parts are detected, as is the case described above, the halftone cycle calculator 211 gives priority to the detection result indicating the existence of a halftone part. In FIG. 10, the number of peripheral pixels in each of the left and right regions is 15.

According to this method, even when the image data of the seam portion includes both halftone and solid parts or is a halftone image including multiple regions having different densities, the density variation detector 215 is prevented from erroneously determining that the image data is solid. Thus, the problem of erroneously subjecting a halftone part, which should not be subjected to the seam correction processing, to the seam correction processing and eliminating the density gradation in the halftone image can be solved.

A specific procedure of the method is described in detail below with reference to FIGS. 11A and 11B. In FIG. 11A, the number of peripheral pixels in each of the left and right regions is 15. The density variation detector 215 determines whether the read image is halftone or solid for each of the left and right regions for each attention pixels, as described above. FIG. 11B is a table showing the results determined by the density variation detector 215. In accordance with some embodiments of the present invention, as described with reference to FIG. 10B, the density variation detector 215 employs one of the detection results in the left and right regions which is greater in the number of detected edges qL or qR, to preferentially determine that the read image is halftone.

The density variation detector 215 determines whether the seam portion of the CIS 201 and CIS 202, or the seam portion of the CIS 202 and CIS 203, is halftone or solid based on the seam-read image read by one of the CIS 201 and CIS 202, or one of the CIS 202 and CIS 203, respectively. In accordance with some embodiments of the present invention, whether the seam portion is halftone or solid is determined based on image data read by one of the line image sensors.

How the density variation detector 215 determines whether the seam portion is halftone or solid based on image data read by one of the line image sensors is described below with reference to FIG. 12. The density variation detector 215 performs the detection of halftone dots based on image data read by the CIS 201, thereby detecting edges qL and qR in the left and right regions, respectively. Similarly, the density variation detector 215 performs the detection of halftone dots based on image data read by the CIS 202, thereby detecting edges qL and qR in the left and right regions, respectively. In accordance with some embodiments of the present invention, one of the detection results in the left and right regions which is greater in the number of edges qL or qR is employed, with respect to both the CIS 201 and CIS 202. The case illustrated in FIG. 12 uses the CIS 201 and CIS 202. Another case using the CIS 202 and CIS 203 provides the same result.

Figure 12:
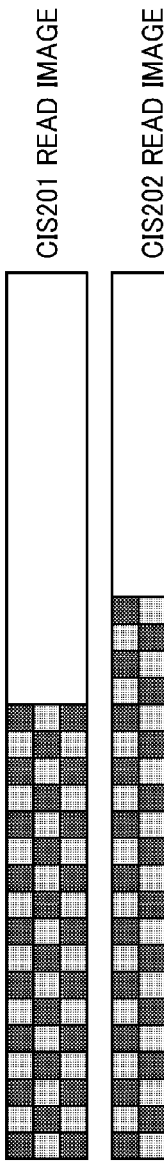
FIG. 12 is an illustration showing a halftone/solid determination processing in accordance with an embodiment of the present invention.

Another case illustrated in FIG. 13 is slightly different from the case illustrated in FIG. 12. In the case illustrated in FIG. 12, the determination of whether the seam portion is halftone or solid is simply based on the number of edges qL and qR detected in the left and right regions, respectively, in both the CIS 201 and CIS 202. On the other hand, in the case illustrated in FIG. 13, the determination is separately made with respect to the CIS 201 and CIS 202 first, and the final determination is made thereafter. In accordance with some embodiments of the present invention, the determination procedure can be changed by changing settings.

Conventionally, as described above with reference to FIGS. 8A and 8B, the halftone dot detecting processing is performed over the entire predetermined region centered at the attention pixel. In accordance with some embodiments of the present invention, the predetermined region centered at the attention pixel is divided into two regions extending on both sides of the attention pixel relative to the main scanning direction, and the density variation detector 215 separately performs the halftone dot detecting processing in each of the two regions. One of the detected results in the respective regions which is greater in the number of detected edges is employed.

In the embodiments illustrated in FIGS. 11 to 13, the halftone dot detecting processing is performed in each of the two regions to count the number of edges therein, for multiple attention pixels in the seam-read image. Among the counted values for the number of edges with respect to the multiple attention pixels, the largest value is employed as the final count number of edges. Thus, the number of edges included in the seam-read image can be accurately counted.

In accordance with some embodiments of the present invention, when the attention pixel is selected from pixels included in the seam-read image, the halftone dot detecting processing is performed in each of two regions which are extending on both sides of the attention pixel relative to the main scanning direction, to count the number of edges in each of the regions. Alternatively, the number of edges may be counted with respect to only one attention pixel, not with multiple attention pixels as is the cases illustrated in FIGS. 11 to 13.

Analyzing two regions which are extending on both sides of the attention pixel relative to the main scanning direction is just an illustrative example. The point is to subject multiple regions in the seam-read image arranged in the main scanning direction to the process of counting the number of edges therein, and to employ the largest value for that number. Accordingly, it is possible to count the number of edges in multiple regions in the seam-read image, not limited to in two regions which are extending on both sides of the attention pixel relative to the main scanning direction, and to employ the largest value for that number.

Based on the number of edges detected by the density variation detector 215, the halftone cycle calculator 211 calculates the halftone cycle from the following formula (1). In the formula (1), T represents a halftone cycle, D represents the number of peripheral pixels, and q represents the number of edges.

$$T = \frac{D}{q} \qquad (1)$$

The halftone cycle T calculated from the formula (1) is used for calculating weighted values by the weighted value calculator 212. The weighted value calculator 212 calculates the weighted values in the following manner. In the following formula (2), G1 and G2 represent weighted values for the CIS 201 and CIS 202, respectively, n represents a position in the main scanning direction when a value "1" is assigned to the left end of a seam portion, and N represents the number of pixels in the seam portion. In the following formula (3), α represents a constant that determines the curve of a weighting coefficient curve.

$$G1 = f(n, T) = \begin{bmatrix} \frac{1}{2}\left\{1 + \left(1 - \frac{2n}{N}\right)^{TS}\right\} & \left(0 < n \leq \frac{N}{2}\right) \\ \frac{1}{2}\left\{1 - \left(\frac{2n}{N} - 1\right)^{TS}\right\} & \left(\frac{N}{2} < n \leq N\right) \end{bmatrix} \quad (2)$$

$$G2 = 1 - G1 = 1 - f(n, T)$$

A variable TS in the formula (2) is calculated from the formula (3). Here, $T_{max}$ represents the maximum cycle within the detection range.

$$TS = \begin{bmatrix} \left(\frac{T}{T_{max}}\right)^\alpha & (T \leq T_{max}) \\ 1 & (T_{max} < T) \end{bmatrix} \quad (3)$$

The halftone cycle calculator 211 calculates the halftone cycle T based on the formula (1). The weighted value calculator 212 calculates the weighted values based on the formulae (2) and (3) using the halftone cycle T calculated by the halftone cycle calculator 211. Specific examples of the weighted values G1 and G2 are shown in FIGS. 14A to 14C in which the halftone cycle is T1, T2, and T3, respectively. In the examples illustrated in FIGS. 14A to 14C, the number of pixels in the seam portion is 128, and the constant a that determines the curve of a weighting coefficient curve is 1. The halftone cycles T1, T2, and T3 satisfy the following relation: halftone cycle T1>halftone cycle T2>halftone cycle T3. The maximum cycle $T_{max}$ is a value between T1 and T2.

When a seam image is finally generated based on the seam-read images read by two of the CISs, the seam correction processor 213 basically multiplies the seam-read images by independent coefficients and add them together. These coefficients are equivalent to the weighted values calculated by the weighted value calculator 212.

Upon calculation of the weighted values, the weighted value calculator 212 supplies the calculated weighted values to the seam correction processor 213. The seam correction processor 213 then performs the seam correction processing, as illustrated in FIGS. 14A to 14C, based on the weighted values supplied from the weighted value calculator 212. FIG. 14A is an illustration showing a case in which the halftone cycle T is T1 that is the longest.

An image having a long halftone cycle T generally refers to an image with less drastic change in gradation, i.e., a solid image or an image similar to that. Accordingly, in the case illustrated in FIG. 14A, the seam-read images read by the CIS 201, CIS 202, and CIS 203 are solid images.

In the case where the seam-read image is a solid image or an image similar to that, the seam correction processing can generate a seam image without emphasizing the boundary between the two seam-read images read by the two CISs.

Thus, when the halftone cycle T is such a large value in excess of $T_{max}$, the weighted values, which are equivalent to the coefficients to multiply each pixel in the seam-read image, become those illustrated in FIG. 14A.

With respect to the seam-read image read by the CIS 201, a weighted value of 1 is assigned to the leftmost pixel, and the weighted value assigned to each pixel linearly decreases toward the rightmost pixel. With respect to the seam-read image read by the CIS 202, a weighted value of 1 is assigned to the rightmost pixel, and the weighted value assigned to each pixel linearly decreases toward the leftmost pixel.

The seam image is generated by synthesizing two seam-read images. More specifically, the seam image is generated by adding corresponding pixel values in the seam-read images read by the CIS 201 and CIS 202, which have been multiplied by an independent weighted value varied according to the position of the pixel in the main scanning direction.

The sum of the weighted values for corresponding pixel values in the seam-read images read by the CIS 201 and CIS 202 comes to 1. Thus, the seam image is generated by adding two seam-read images read by two of the CISs while blurring the seam by adjusting the weighted values as illustrated in FIG. 14A.

However, if this processing is conducted in the case where the CIS 201 and CIS 202 are out of alignment in the main scanning direction or the sub-scanning direction, the problem described above with reference to FIGS. 9A and 9B may arise.

FIG. 14C is an illustration showing a case in which the halftone cycle T is T3 that is the shortest. In the case illustrated in FIG. 14C, the seam-read images read by the CIS 201, CIS 202, and CIS 203 are halftone images. According to the formula (3), as the halftone cycle T becomes shorter, the variable TS approaches zero. According to the formula (2), as the variable TS approaches zero, G1 approaches one, when n is not greater than N/2, or zero, when n is not less than N/2.

In this case, the process of multiplying the seam-read images read by the CIS 201 and CIS 202 by the weighted values and adding them together is not performed, as shown in FIG. 14C. Instead, the seam image is generated from one of the seam-read images read by one of the CISs corresponding to pixels at the position N/2 or less and the other seam-read image read by the other CIS corresponding to pixels at the position greater than N/2.

In this case, the seam-read images read by the two CISs are put together at the position N/2. Therefore, there is a possibility that the seam portion in the image at the position N/2 become highly visible, however, elimination of the gradation in a halftone image part, as is the case illustrated in FIGS. 9A and 9B, does not occur since the process of adding the two seam-read images read by the two CISs is not performed.

FIG. 14B is an illustration showing a case in which the halftone cycle T is T2. T2 is smaller than the maximum cycle $T_{max}$ and does not make the variable TS calculated by the formula (3) too close to zero. In this case, the seam-read image is an image having both a halftone part and a solid part, or a relatively-rough halftone image. In this case, the weighted values, varied according to the position in the main scanning direction, more gently varies than in the case illustrated in FIG. 14A. The weighted values transit with giving much importance to one of the seam-read images read by one of the two CISs. The weighted values undergo a precipitous change at around the position N/2, thereby switching the seam-read image to be given much importance.

In the case illustrated in FIG. 14B, at positions other than the position N/2 and the periphery thereof in the main scanning direction, one of the seam-read images read by one of the CISs is given much importance. Therefore, even if the seam-read image is a halftone image and there exists a misalignment in the main scanning direction or sub-scanning direction, the seam-read images can be added together without losing the feature of the image. By contrast, at the periphery of the position N/2 in the main scanning direction, the two seam-read images read by the two CISs are added together at the same rate, thereby blurring the seam portion. In the case illustrated in FIG. 14B, this process makes it possible not to eliminate the gradation in the halftone image and to blur the seam portion in the image.

The form-into-one-line processor 214 generates an image corresponding to one line, based on read images read by the CIS 201 to CIS 203 transferred in parallel and the seam image generated by the seam correction processor 213, and transfers the image to the engine controller 120 illustrated in FIG. 4.

In the line synthesis processor 210, the seam image is generated by synthesizing the two seam-read images read by two CISs at a predetermined ratio. At the same time, the density variation detector 215 counts the number of edges included in the seam image. The halftone cycle calculator 211 calculates the halftone cycle T, for the case where the density gradation appears in a cyclic manner, based on the count result using the formula (1).

The weighted value calculator 212 calculates the weighted values based on the above-calculated halftone cycle T using the formulae (2) and (3). The weighted values thus calculated are used as the rate between the two seam-read images read by two CISs when the seam correction processor 213 synthesizes them. The form-into-one-line processor 214 synthesizes the generated seam image with the images of other portions to generate a read image corresponding to one line. The weighted value calculator 212 and the seam correction processor 213 cooperate with each other to function as a seam processor. In addition, the form-into-one-line processor 214 functions as a line image generator.

In the process of generating the seam image by the line synthesis processor 210, the halftone cycle calculator 211 calculates the halftone cycle T. At that time, the halftone cycle calculator 211 refers to not only the entire seam image but also a part of the seam image, and also refers to the number of edges in multiple regions counted by the density variation detector 215. Among the count values for the number of edges in the multiple regions, the largest value is employed as the final count value to calculate the halftone cycle T.

Owing to such a processing, even when the seam-read image includes multiple regions having different densities, thresholds for determining edges can be properly set and the number of edges can be correctly counted. In addition, even when the seam-read image includes a fouling or a poor-printing quality region (e.g., blurring), a halftone image part is prevented from being erroneously determined not to be solid.

In the embodiments illustrated in FIGS. 11 to 13, whether the read image is halftone or not is determined by comparing the counted number of edges with thresholds. The point of these embodiments is to employ the largest value for the counted number of edges. Therefore, the determination of whether the read image is halftone or not needs not necessarily be conducted.

On the other hand, the calculation of the halftone cycle T based on the formula (1) and the calculation based on the formula (3) can be simplified based on the determination result whether the read image is halftone or not. As the counted number of edges becomes larger, the calculation result of the formula (1) becomes smaller, and therefore, the calculation result of the formula (3) approaches zero. As a result, the process of generating the seam image transits from the case illustrated in FIG. 14B to the case illustrated in FIG. 14C, i.e., from the case in which two seam-read images read by two CISs are synthesized at a predetermined ratio to the case in which two seam-read images read by two CISs are connected together at the position N/2.

These processes are conducted based on the calculation results of the formulae (1) to (3). On the other hand, when the read image is determined to be halftone as the counted number of edges is large enough to exceed a predetermined threshold, it can be determined that TS is zero without performing the calculations of the formulae (1) and (3). In this case, the process can be simplified with omitting the calculations of the formulae (1) to (3).

When the calculation of the formula (3) is performed based on the counted number of edges, TS approaches zero as T becomes smaller but never becomes zero. As a result, the calculation results of G1 and G2 based on the formula (2) never become 0 and 1, respectively, and the seam correction processor 213 performs calculations using a coefficient being not 0 or 1.

By contrast, when the read image is determined to be halftone and TS is set to zero, the calculation results of G1 and G2 based on the formula (2) completely become 0 and 1, respectively. Therefore, the seam correction processor 213 only has to employ one of the two seam-read images read by two of the CISs on both sides of the position N/2, simplifying the process.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. A read image processing apparatus for processing a read image read by a reading part including a plurality of line image sensors, each of the line image sensors including reading elements arranged in line corresponding to pixels, the line image sensors being arranged in such a manner that one end parts of the line image sensors adjacent to each other are overlapped with each other in a direction perpendicular to a direction of alignment of the reading elements, comprising:
    a density variation detector to detect whether a density variation occurs for not less than a predetermined number of times or not in each of a plurality of regions in a seam-read image, the seam-read image being an image read by the reading elements present within a seam portion in which the line image sensors adjacent to each other are overlapped with each other;
    a seam processor to generate a seam image by synthesizing the seam-read images read by the line image sensors adjacent to each other in accordance with a detection result made by the density variation detector, the seam image being an image of the seam portion; and
    a line image generator to generate a read image corresponding to one line based on read images read by the line image sensors and the seam image generated by the seam processor.

2. The read image processing apparatus according to claim 1,
    wherein the density variation detector analyzes a frequency of an occurrence of the density variation for not less than the predetermined number of times in each of the plurality of regions in the seam-read image, and
    wherein the seam processor uses the largest value among the analyzed frequency values when generating the seam image.

3. The read image processing apparatus according to claim 2,
    wherein the density variation detector counts the number of portions in each of the plurality of regions in the seam-read image in which an amount of the density variation is not less than a predetermined amount, and
    wherein the seam processor uses the largest value among the counted values when generating the seam image.

4. The read image processing apparatus according to claim 1, wherein the plurality of regions in the seam-read image include a pair of regions extending on both sides of an attention pixel in the direction of alignment of the reading elements, the attention pixel being selected from a plurality of pixels included in the seam-read image.

5. The read image processing apparatus according to claim 4, wherein the attention pixel includes a plurality of attention pixels selected from the plurality of pixels included in the seam-read image, and the plurality of regions in the seam-read image include a plurality of the pair of regions extending on both sides of each of the attention pixels in the direction of alignment of the reading elements.

6. The read image processing apparatus according to claim 1, wherein the seam processor is capable of performing:
    a synthesis processing for synthesizing corresponding pixels in the seam-read images read by the respective line image sensors by means of weighing by weighted values calculated based on a detection result made by the density variation detector, to generate the seam image; and
    a connection processing for selecting one of the seam-read images read by the respective line image sensors for each pixel and connecting the selected seam-read images, to generate the seam image,
    wherein the seam processor performs the connection processing when a frequency of an occurrence of the density variation for not less than the predetermined number of times in each of the plurality of regions in the seam-read image is in excess of a predetermined frequency.

7. An image reading apparatus, comprising:
    a document feeder to feed a document;
    a reading part to generate a read image of the document; and
    the read image processing apparatus according to claim 1 to process the read image.

8. An image forming apparatus, comprising:
    the image reading apparatus according to claim 7 to read an image; and
    an image formation output unit to form an image based on the image read by the image reading apparatus.

9. A method of processing a read image read by a reading part including a plurality of line image sensors, each of the line image sensors including reading elements arranged in line corresponding to pixels, the line image sensors being arranged in such a manner that one end parts of the line image sensors adjacent to each other are overlapped with each other in a direction perpendicular to a direction of alignment of the reading elements, comprising:
    detecting whether a density variation occurs for not less than a predetermined number of times or not in each of a plurality of regions in a seam-read image, the seam-read image being an image read by the reading elements present within a seam portion in which the line image sensors adjacent to each other are overlapped with each other;
    generating a seam image by synthesizing the seam-read images read by the line image sensors adjacent to each other in accordance with a detection result made in the detecting, the seam image being an image of the seam portion; and
    generating a read image corresponding to one line based on read images read by the line image sensors and the seam image.

10. A non-transitory recording medium storing a plurality of instructions which, when executed by one or more processors, cause the processors to perform a method of processing a read image read by a reading part including a plurality of line image sensors, each of the line image sensors including reading elements arranged in line corresponding to pixels, the line image sensors being arranged in such a manner that one end parts of the line image sensors adjacent to each other are overlapped with each other in a direction perpendicular to a direction of alignment of the reading elements, comprising:

detecting whether a density variation occurs for not less than a predetermined number of times or not in each of a plurality of regions in a seam-read image, the seam-read image being an image read by the reading elements present within a seam portion in which the line image sensors adjacent to each other are overlapped with each other;

generating a seam image by synthesizing the seam-read images read by the line image sensors adjacent to each other in accordance with a detection result made in the detecting, the seam image being an image of the seam portion; and generating a read image corresponding to one line based on read images read by the line image sensors and the seam image.

\* \* \* \* \*